Sept. 22, 1942.　　　L. FORGY　　　2,296,605
PLOW
Filed May 20, 1941　　　2 Sheets-Sheet 1

Inventor
Lorin Forgy,
By Wolhaupter & Groff
Attorneys

Sept. 22, 1942.  L. FORGY  2,296,605
PLOW
Filed May 20, 1941  2 Sheets-Sheet 2
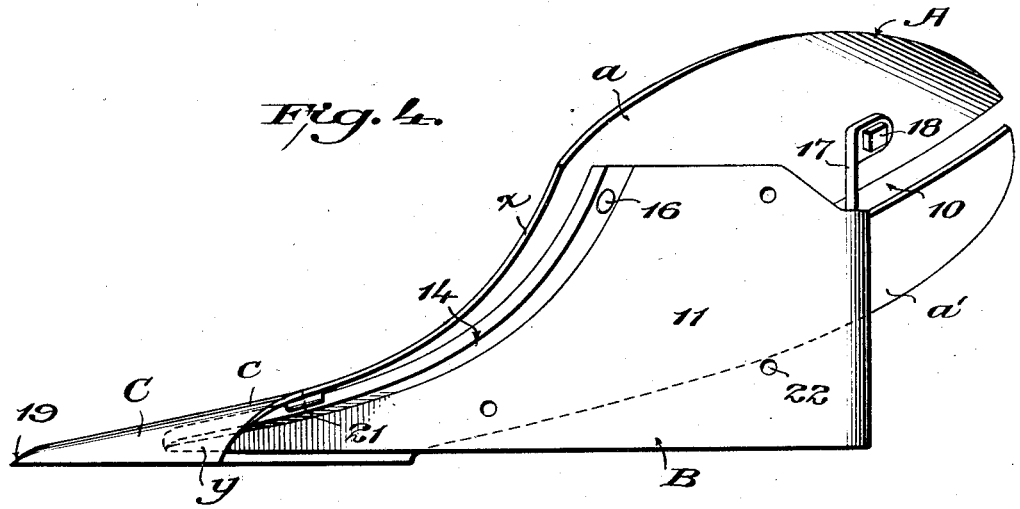
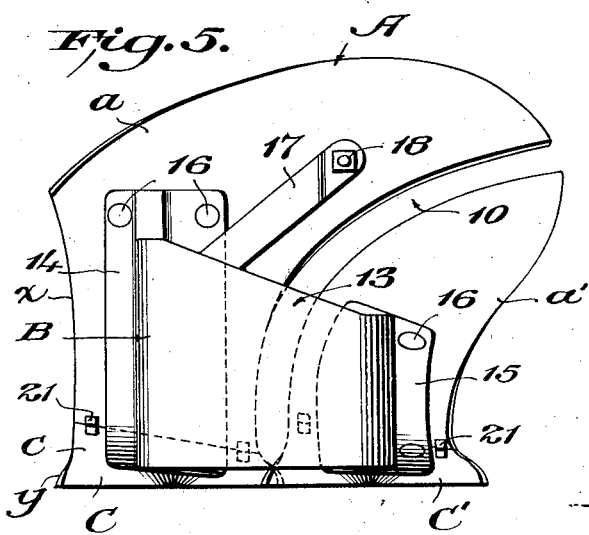
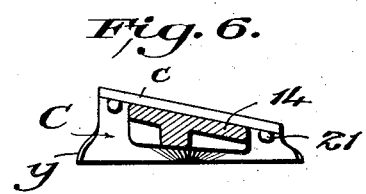
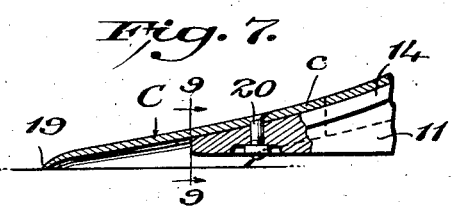
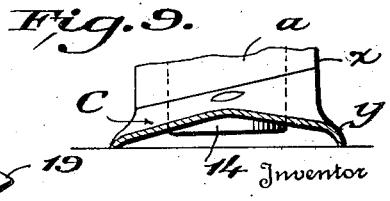
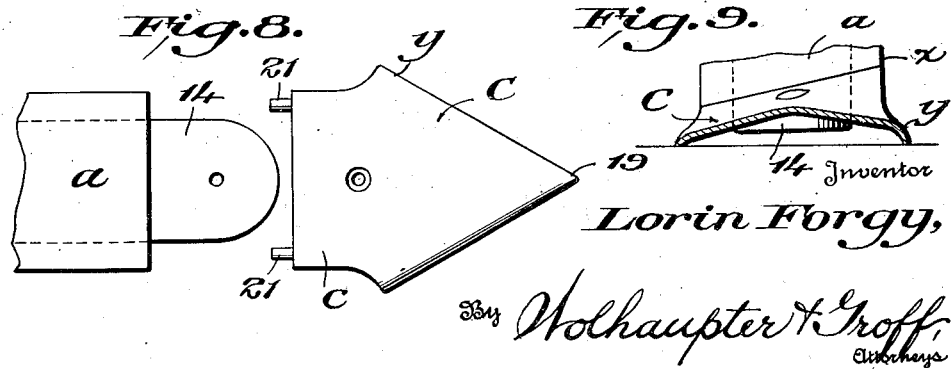
Inventor
Lorin Forgy,
By Wolhaupter & Groff
Attorneys Patented Sept. 22, 1942

2,296,605

UNITED STATES PATENT OFFICE 2,296,605

PLOW

Lorin Forgy, Beloit, Kans.

Application May 20, 1941, Serial No. 394,342

3 Claims. (Cl. 97—123)

This invention relates to plows of the type having a mold board of substantially spiral form to turn soil from and deposit it at the side of a furrow, and has for its general object to provide a plow of this type which requires materially less draft force to form a furrow of any given width and depth than any known comparable plow of like type.

According to the invention the foregoing general object is accomplished, generally speaking, by providing a substantially spiral mold board having a substantially horizontally disposed front end portion and a substantially vertically disposed rear end portion, by slotting said mold board from approximately the middle of its front end to its rear end along a curved line conforming approximately to the pitch of the mold board, by providing substantially flat, substantially horizontally disposed soil penetrating points at the front end of said mold board, one to either side of said slot, with the outer of said points disposed rearwardly of the inner of said points so that the plow scours thoroughly; by having the inner side edge of the front portion of the mold board disposed substantially vertically so as to vertically cut the inner side of a furrow; by having the inner side of the leading point of the plow formed to provide a shoulder for engagement with the soil at the inner side of the furrow to counteract tendency of the turned soil to urge the plow inwardly, and by having the portion of the mold board at the inner side of the slot therein of a height or width such that all of the soil cut by the plow is turned from the furrow by the mold board and no part of the cut soil is permitted to pass over the mold board and fall behind the plow into the furrow.

The soil penetrating points are of substantially triangular shape as viewed in plan, and in this connection and according to a preferred embodiment of the invention, a special object of the invention is to dispose the inner, rear portion of the outer point inwardly with respect to the outer, rear portion of the inner point so that said points thus cooperate to sever roots and the like for free passage through the slot in the mold board.

With the foregoing and other objects in view, which will become more fully apparent as the nature of the invention is better understood, the same consists in a plow embodying the novel features of construction, combination and arrangement of parts as will be hereinafter more fully described, illustrated in the accompanying drawings and defined in the appended claims.

In the accompanying drawings, wherein is illustrated a practical embodiment of the invention and wherein like characters of reference denote corresponding parts in the different views:

Figure 4 is a side elevation looking toward the inner side of the plow.

Figure 5 is a rear elevation of the plow.

Figure 6 is a cross section on the line 6—6 of Fig. 2.

Figure 7 is a central longitudinal section through one of the points of the plow showing how it is mounted on the frog.

Figure 8 is a detail plan view showing one of the points separated from the related front end portions of the mold board and the frog; and Figure 9 is a cross section on the line 9—9 of Fig. 7.

Figure 1:
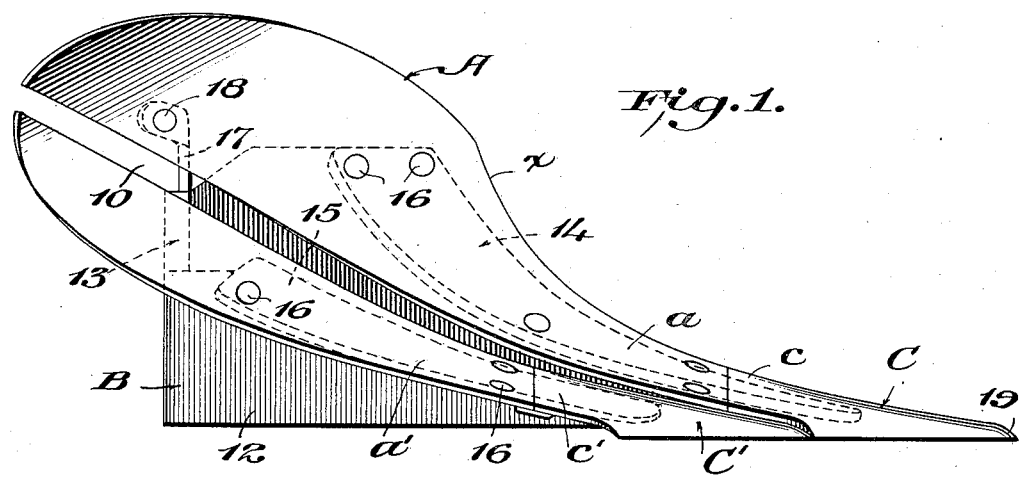
Figure 1 is a side elevation looking toward the outer side of a plow constructed in accordance with a practical embodiment of the invention.
Figure 2:
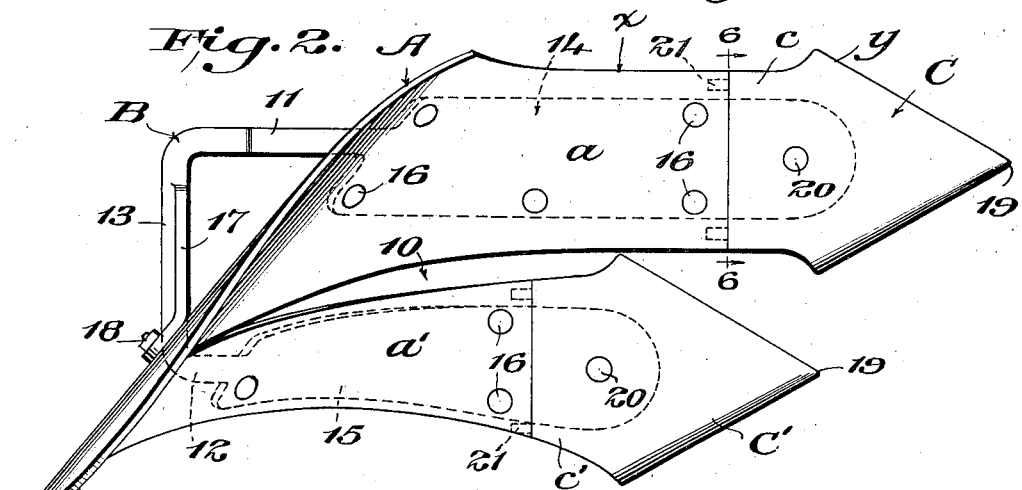
Figure 2 is a top plan view of the plow.
Figure 3:
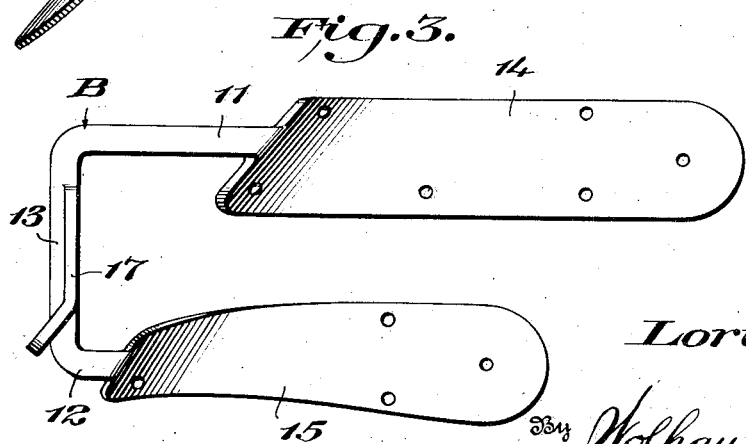
Figure 3 is a top plan view of the frog to which the mold board and the points of the plow are fastened.

Referring to the drawings in detail, A designates, generally, the mold board of the present plow which, in accordance with the invention and also in accordance with known practice, is of substantially spiral form to turn soil from and deposit it at the side of a furrow as the plow is advanced; B designates, generally, a frog upon which said mold board is mounted and through the instrumentality of which the plow may be mounted upon a suitable beam, and C, C' designate, generally, inner and outer soil penetrating points mounted on said frog B at the front end of the mold board A and constituting, in effect, forward continuations of said mold board.

The front end portion of the mold board A, while inclined slightly upwardly and inwardly, is, generally speaking, disposed substantially horizontally and is of material width so as to act in the nature of a shovel or scoop, while the rear end portion of said mold board is disposed substantially vertically. Accordingly, since said mold board is, as aforesaid, of substantially spiral form, it acts as aforesaid to turn the soil and deposit it at the outer side of a furrow as the plow is advanced.

In the mold board A is a slot 10 which extends from a point approximately midway between the side edges of said mold board at the front end thereof to the rear end thereof and which is curved to conform substantially to the pitch of said mold board or to what is the natural line of travel of soil over said mold board where said slot is located, so that roots or the like entering said slot at the front end thereof travel freely therethrough to the rear end thereof as the plow is advanced. This slot may be of any suitable width and, of course, extends through the mold board, thereby separating said mold board into inner and outer sections designated as *a* and *a'*, respectively.

The frog B is designed to fasten the mold board sections *a* and *a'* rigidly together without offering obstruction to the free travel of roots and the like through the slot 10, and to this end said frog is of open-front, substantially C-shape as viewed in plan and comprises laterally spaced apart, forwardly and rearwardly extending inner and outer legs 11 and 12, respectively, joined together at their rear ends by a cross member 13. The inner leg 11 underlies the inner section *a* of the mold board and the outer leg 12 underlies the outer section *a'* of said mold board, and at the tops of said legs are flange formations 14 and 15, respectively, the top faces of which conform to the curvature of the sections *a* and *a'* of the mold board directly thereabove and to which said sections *a* and *a'* are rigidly fastened in any suitable manner as, for example, by rivets, bolts or the like as indicated at 16. In this connection and in order to assist in rigidly supporting the rear end portion of the inner mold board section *a*, an arm 17 rigid with the cross member 13 may extend upwardly and outwardly from said cross member and may have the rear end portion of the inner mold board section fastened to its upper or outer end as indicated at 18. In this connection and as best shown in Fig. 5 of the drawings, the arm 17 is disposed entirely inwardly with respect to the slot 10 so as not to interfere with the travel of roots or the like through said slot. Also, the cross member 13 of the frog 12 has its top spaced amply downward from the slot 10 so as not to interfere with travel of roots or the like through said slot.

The front end of the inner mold board section *a* is disposed in advance of the front end of the outer mold board section *a'* and the front end portions of the flange formations 14 and 15 of the frog B extend forwardly of the said front ends of said mold board sections *a*, *a'*, respectively, to afford supports for the points C, C', respectively.

The points C, C' are of substantially triangular shape as viewed in plan and are disposed horizontally with their tips 19 approximately in line with the centers of the front ends of the sections *a*, *a'*, respectively. Their side edges are sharp and are substantially disposed and diverge rearwardly from the tips 19 so as easily to penetrate the soil and cut any roots or the like which they encounter. They progressively increase in height from their tips 19 to their rear ends and from their side edges toward their longitudinal center line, and they are bolted or otherwise suitably fastened, preferably detachably, upon the projecting front end portions of the flange formations 14 and 15 by bolts or other suitable fasteners, as indicated at 20. They have at their rear ends upwardly and inwardly inclined shank portions *c*, *c'*, respectively, the rear ends of which abut the front ends of the mold board sections *a* and *a'*, respectively, and the top surfaces of which are flush with the slightly upwardly and inwardly inclined front ends of the mold board sections *a*, *a'*. Moreover, to assist the bolts or other fasteners 20 in holding said points properly positioned at the front ends of the mold board sections *a*, *a'*, the shanks *c*, *c'* of said points have extending rearwardly therefrom lugs 21 to underlie and engage the under faces of the front end portions of said mold board sections *a*, *a'* near the side edges thereof. Regarding these lugs 21, it will be noted that same are disposed entirely below the shanks *c*, *c'* so as to avoid any necessity of notching the front ends of the mold board sections *a*, *a'* to accommodate them.

The shanks *c*, *c'* of the points C, C' are equal in width to the front ends of the mold board sections *a*, *a'* and said points at their zones of greatest width are wider than said shanks, preferably projecting substantially equal distances beyond each side of said shanks. In any event, at least the outer side of the inner point C and the inner side of the outer point C' project at least partly across a forward continuation of the slot 10 and preferably in overlapping relationship to each other with respect to the direction of travel of the plow. Accordingly, the said outer, and inner edges of said points C, C' cooperate with each other to effectively sever any roots or the like encountered by said edges during advance of the plow. In particular, the inner edge of the outer point C' cooperates with the outer edge of the mold board section *c* for this purpose.

The inner side edge *x* of the front portion of the inner mold board section *a* is disposed substantially vertically for vertically cutting the inner side of a furrow, and the said inner mold board section *a* is of a height and width such that all of the soil cut by the edge *x* is turned from the furrow and no part of the cut soil is permitted to pass over the mold board and fall behind the plow into the furrow.

The inner side of the leading point C provides a shoulder *y* (see Figs. 4 and 9) to engage the soil at the inner side of a furrow being formed to resist lateral inward movement of said point C and thus to resist lateral inward movement of the front end of the plow, thereby counteracting the pressure of the soil against the mold board and the tendency of such pressure to shift the front end of the plow laterally inward. This eliminates any necessity of a land side for the plow with its great friction and thus materially reduces the amount of draft necessary to advance the present plow.

As the plow is advanced the inner point C penetrates the soil in advance of the outer point C' and any roots or the like are severed by the side edges of said points. Such roots or the like as are cut by the outer edge of the inner point C and by the inner edge of the outer point C' enter the slot 10 and pass freely therethrough due to said slot being curved in conformity with the pitch of the mold board or, in other words, in conformity with the natural line of travel of soil over the mold board where said slot is located. Moreover, due to the points C, C' being substantially flat and being disposed substantially horizontally, one in advance of the other, and due to the generally spiral form of the mold board, combined with the slot 10 therein, the cutting edge *x*, the shape of the mold board section *a* to insure against soil passing over the mold board into the furrow, and the shoulder *y* at the inner side of the point C to counteract the pressure against the mold board of the soil being turned, the plow is exceptionally easy to advance, requiring materially less draft force to effect its advance than any known comparable prior plow for forming a furrow of equal width and depth.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A plow comprising a mold board of substantially spiral form to turn soil from and deposit it at the side of a furrow, the front end portion of said mold board being disposed substantially horizontally and the rear end portion being disposed substantially vertically, said mold board having a slot extending from a point approximately midway between its side edges at its front end to its rear end and said slot being curved to conform substantially to the pitch of the mold board so that roots and the like pass freely through the same from front end to rear end thereof as the plow is advanced, and a pair of substantially flat substantially horizontally disposed soil penetrating points at the front of said mold board one to either side of said slot, the section of said mold board at the inner side of said slot having a substantially vertically disposed inner front edge to shave the soil at the inner side of a furrow cut by the plow, and the said section of said mold board to the inner side of said slot being of spiral form continuously to said edge and further being of a height and width to turn all soil cut by the plow and to prevent any of the cut soil from passing over the mold board and falling behind the plow into the furrow.

2. A plow comprising a mold board of substantially spiral form to turn soil from and deposit it at the side of a furrow, the front end portion of said mold board being disposed substantially horizontally and the rear end portion being disposed substantially vertically, said mold board having a slot extending from a point approximately midway between its side edges at its front end to its rear end and said slot being curved to conform substantially to the pitch of the mold board so that roots and the like pass freely through the same from front end to rear end thereof as the plow is advanced, and a pair of substantially flat substantially horizontally disposed soil penetrating points at the front of said mold board one to either side of said slot, the point at the inner side of said slot having a shoulder at its inner side for engagement with the soil to resist inward movement of the front portion of the plow, thereby to counteract the inward pressure against the plow of the soil being turned and the tendency of such pressure to shift the front end of the plow inwardly, said shoulder being comprised by the inner side of said point and being disposed in its entirety below the top face of said point.

3. A plow comprising a mold board of substantially spiral form to turn soil from and deposit it at the side of a furrow, the front end portion of said mold board being disposed substantially horizontally and the rear end portion being disposed substantially vertically, said mold board having a slot extending from a point approximately midway between its side edges at its front end to its rear end and said slot being curved to conform substantially to the pitch of the mold board so that roots and the like pass freely through the same from front end to rear end thereof as the plow is advanced, and a pair of soil penetrating points at the front of said mold board one to either side of said slot, the section of said mold board at the inner side of said slot having a substantially vertically disposed inner front edge to shave the soil at the inner side of a furrow cut by the plow, and the said section of said mold board to the inner side of said slot being of spiral form continuously to said edge and further being of a height and width to turn all soil cut by the plow and to prevent any of the cut soil from passing over the mold board and falling behind the plow into the furrow.

LORIN FORGY.